Oct. 30, 1945.    F. SMITH    2,388,093
LIQUID DELIVERY APPARATUS
Filed Jan. 16, 1943
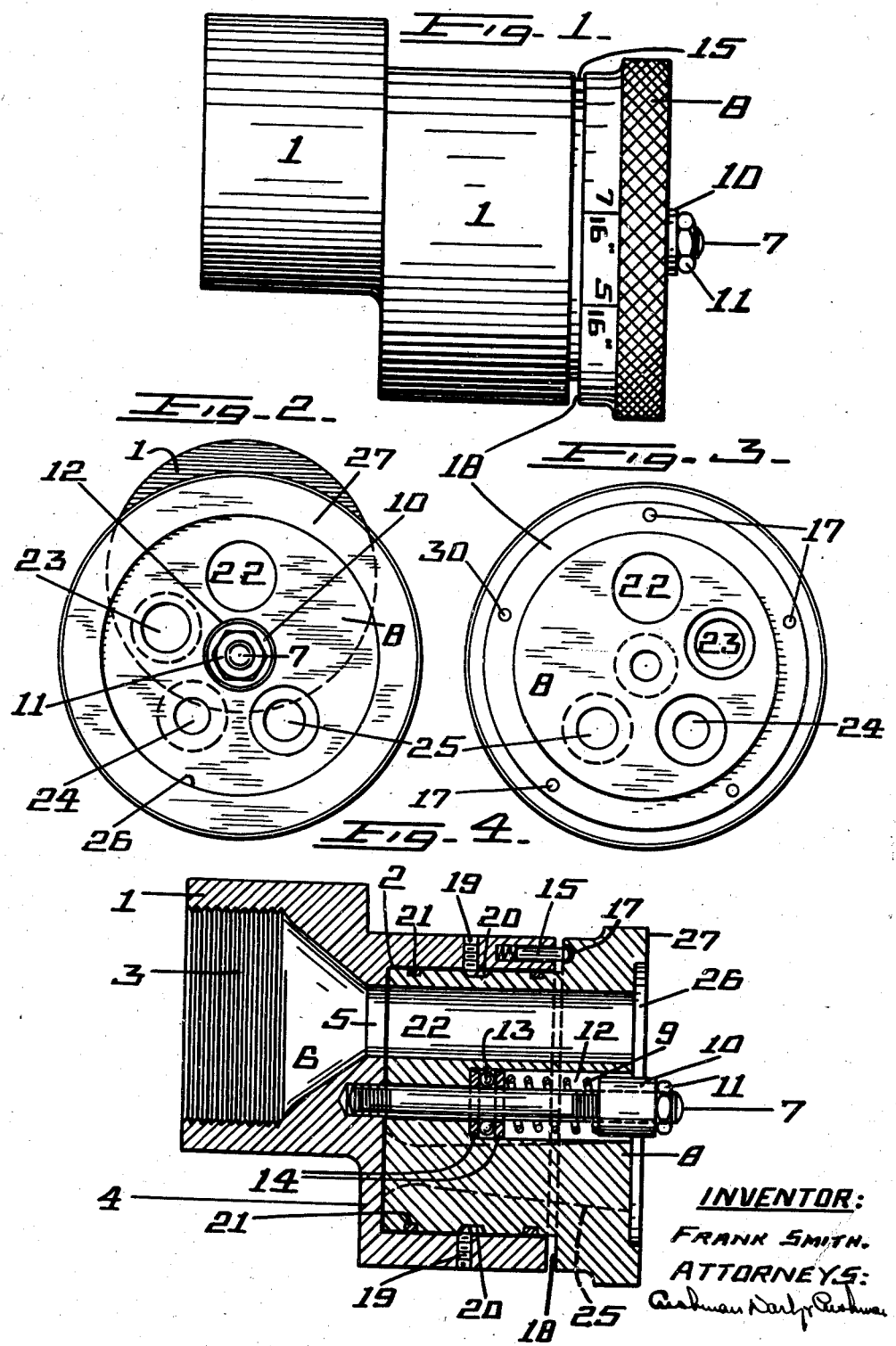
INVENTOR:
FRANK SMITH.
ATTORNEYS:

Patented Oct. 30, 1945

2,388,093

UNITED STATES PATENT OFFICE 2,388,093

LIQUID DELIVERY APPARATUS

Frank Smith, Huddersfield, England

Application January 16, 1943, Serial No. 472,647
In Great Britain October 8, 1942

1 Claim. (Cl. 299—139)

The invention relates to liquid delivery apparatus, the object being to provide new or improved means for controlling the flow of liquid from said apparatus, whereby a perfect jet or flow of liquid occurs under all conditions.

The invention will now be described with reference to the accompanying drawing, in which—

Figure 1 is an elevation of liquid delivery apparatus intended for use with a hose pipe or the like, constructed according to the invention.

Figure 2 is an end view looking from the right of Figure 1.

Figure 3 is an end view of the revoluble portion of the apparatus illustrated in Figures 1 and 2, looking from the left of Figure 1.

Figure 4 is a sectional elevation of the apparatus.

1 is the body of the apparatus provided with a cylindrical cavity 2 and an internally screw-threaded bore 3, the wall 4 between said cavity and bore having formed therein an aperture 5 communicating with the bore 3 by means of a frusto-conical bore 6.

7 is a stud screwing into the base of cavity 2, upon which is located a revoluble member or rotor 8 retained snugly in position within said cavity by means of a helical spring 9 mounted upon said stud, and adjusting nut 10 and locknut 11. Interposed between the spring 9 and a shoulder of the recess 12 housing the same are ball bearings 13 held between washers 14.

15 is a spring biassed catch or plunger mounted within a recess in the body 1 of the apparatus, the outer end of catch 15 being adapted to normally project and engage one of a series of corresponding dimples 17, 30, concentrically arranged upon the underside of flange 18 of rotor 8.

19 are grub-screws or the like passing through the body of the apparatus into engagement with an annular recess 20 in rotor 8 for serving as additional securing means for the latter against the thrust of the liquid, and 21 are elastic or similar packing rings for preventing leakage of liquid around the outside of said rotor.

Within the rotor are a plurality of orifices or passages 22, 23, 24 and 25, said orifices having a common centre line concentric with stud 7 and corresponding to the centre of aperture 5 in the body 1. The bore of orifice 22 is cylindrical and corresponds in diameter to the diameter of aperture 5. The diameter of the inlet end of each of orifices 23 and 24 also corresponds to the diameter of aperture 5, but each of said orifices or passages tapers to a smaller diameter at the outlet end thereof. In the case of orifice 25, the inlet end is throated and tapers outwardly to a greater diameter than said throated portion thereof.

26 is a circular recess formed in the end of rotor 8 for providing a protecting flange 27 for the outlet ends of the various orifices already described.

Assuming that it is desired to provide a liquid delivery according to the maximum capacity of the apparatus, the latter may be secured to the end of a hose pipe or the like by means of the screw-threaded portion 3. Rotor 8 is then revolved or adjusted until orifice 22 therein is brought into register with aperture 5 of body 1, spring catch 15 engaging the corresponding dimple 17 in flange 18 to locate and lock the adjustment. Upon the liquid supply being turned on said liquid enters bore 6, passes through aperture 5 and away through orifice 22 in the form of a jet.

Should it be desired to reduce the water supply or to increase the pressure or velocity of the jet of issuing liquid, rotor 8 may be turned or adjusted until either of orifices 23 or 24 registers with aperture 5, in which case the outlet bore by tapering to a smaller diameter than the inlet produces the desired effect.

When the issuing liquid is desired in the form of a spray, the rotor 8 is moved until orifice 25 registers with aperture 5, when, owing to the diameter of said orifice gradually increasing in diameter towards the outlet, the liquid is permitted to expand and issue from the outlet 25 in the desired spray form.

If it becomes necessary to turn off the liquid supply, rotor 8 may be moved until dimple 30 is engaged by spring catch 15, which brings the blank portion of said rotor between orifices 22 and 25, opposite to aperture 5, thereby preventing further flow of liquid.

Spring 9 may be loaded, by means of nuts 10 and 11, according to the pressure of the liquid at the source of supply in order to prevent rotor 8 from becoming displaced or lifted from its seat, the ball bearings 13 by eliminating friction, rendering it possible to easily and quickly adjust the rotor against any head or pressure of incoming liquid, according to requirements.

Around the periphery of flange 18 of rotor 8, and radially opposite to the several orifices or bores thereof are engraved or otherwise marked, appropriate indications of the sizes or effects which may be produced by bringing said orifices into register with aperture 5.

By these means it will be obvious that the multi-jet or multi-bore nozzle 8 has several distinct advantages over the usual single jet type of nozzle; that jets of a plurality of different sizes, together with a spray or sprays, may be produced according to requirements, and that the liquid flow may be shut off when desired, in a very simple and effective manner.

It must be understood, however, that numerous modifications or additions may be incorporated in the apparatus without in any way departing from the spirit of the invention.

What I claim as my invention and desire to secure by Letters Patent is:

A liquid delivery apparatus comprising a tubular body having a liquid inlet at one end and a cavity at its other end, said cavity being offset axially relative to the inlet and communicating therewith through a reduced port, a revovable member mounted in said cavity and having spaced circumferentially disposed liquid outlet openings arranged selectively to register with said port, said openings being of different diameters to eject the liquid in the form of a jet or a spray from the revolvable member, said revolvable member having a centrally disposed bore registering with a threaded recess in said body, said bore having a shoulder portion therein, a stud extending through the bore of the revolvable member and having its ends threaded, the inner end of said stud being connected to said threaded recess, spring means confined between the shoulder portion of the bore and the outer end of the stud for maintaining the tubular member in said cavity, and yieldable means carried by said body and disposed substantially parallel to the axis of the revoluble member so as to engage said flange for maintaining the tubular member in a fixed position relative to said body.

FRANK SMITH.